United States Patent
Ben-Bassat et al.

(10) Patent No.: US 10,310,492 B2
(45) Date of Patent: Jun. 4, 2019

(54) MULTI-DIMENSIONAL RESOURCE OPTIMIZATION IN THE MANUFACTURE OF THREE-DIMENSIONAL ELEMENTS BACKGROUND

(71) Applicant: Plataine Ltd, Petach Tikva (IL)

(72) Inventors: Moshe Ben-Bassat, Tzur Moshe (IL); Avner Ben-Bassat, Even Yehuda (IL); Eduard Goldner, Tel Aviv (IL); Arie Shental, Givataim (IL)

(73) Assignee: PLATAINE LTD., Petach Tikva (IL)

( * ) Notice: Subject to any disclaimer, the term of this patent is extended or adjusted under 35 U.S.C. 154(b) by 501 days.

(21) Appl. No.: 14/534,178

(22) Filed: Nov. 6, 2014

(65) Prior Publication Data
US 2016/0132049 A1    May 12, 2016

(51) Int. Cl.
*G06F 19/00*        (2018.01)
*G05B 19/418*       (2006.01)

(52) U.S. Cl.
CPC ............. *G05B 19/41865* (2013.01); *G05B 2219/32015* (2013.01); *G05B 2219/35162* (2013.01); *Y02P 80/40* (2015.11); *Y02P 90/20* (2015.11); *Y02P 90/265* (2015.11)

(58) Field of Classification Search
None
See application file for complete search history.

(56) References Cited

U.S. PATENT DOCUMENTS

| | | | | |
|---|---|---|---|---|
| 6,470,228 B1* | 10/2002 | Turner | ............... | G06Q 10/087 700/107 |
| 6,675,057 B2* | 1/2004 | Liu | ............... | H01L 21/268 219/121.6 |
| 7,539,630 B2* | 5/2009 | Crampton | ............... | G06Q 10/06 705/26.1 |

(Continued)

OTHER PUBLICATIONS

Katsume et al, Manufacturing Processes and Products of Steel Pipes and Tubes in JFE Steel, F=JFE GIHO No. 9, Aug. 2005, pp. 1-6.*

*Primary Examiner* — Diem K Cao
(74) *Attorney, Agent, or Firm* — Naomi S. Rosenman-Helfand

(57) ABSTRACT

The invention provides a computerized method for optimization of efficiency of a production floor producing three-dimensional products using two-dimensional cutting machines, the method comprising:
a. receiving input parameters comprising job data, due dates, product design data, production floor resources available and inventory data;
b. maintaining in memory manufacturing rules and objectives;
c. assigning relative weights of importance to the input parameters and to the manufacturing rules and objectives;
d. computing, based on the input parameters, on the manufacturing rules and objectives and on the relative weights of importance, a production floor work plan schedule;

(Continued)

e. determining whether the schedule is efficient in utilization of materials and resources available; if so, outputting the production floor work plan schedule;

f. if the computed production floor schedule is determined to be inefficient, repeating steps (d) and (e) until it is determined to be efficient.

A system for optimization of a production floor work plan schedule is also disclosed.

16 Claims, 10 Drawing Sheets

(56) References Cited

U.S. PATENT DOCUMENTS

| | | | | |
|---|---|---|---|---|
| 2003/0065415 | A1* | 4/2003 | Hegde | G06Q 10/06 |
| | | | | 700/100 |
| 2004/0107730 | A1* | 6/2004 | Hengst | G01N 21/896 |
| | | | | 65/29.18 |
| 2012/0232687 | A1* | 9/2012 | Mikkelsen | G05B 19/40937 |
| | | | | 700/122 |
| 2013/0010552 | A1* | 1/2013 | Jeddeloh | G11C 5/02 |
| | | | | 365/193 |
| 2013/0078405 | A1* | 3/2013 | Schryver | A61F 13/15 |
| | | | | 428/40.1 |
| 2014/0343711 | A1* | 11/2014 | Aqlan | G05B 19/41865 |
| | | | | 700/101 |

* cited by examiner

MULTI-DIMENSIONAL RESOURCE OPTIMIZATION IN THE MANUFACTURE OF THREE-DIMENSIONAL ELEMENTS

BACKGROUND

BACKGROUND OF THE INVENTION

There are diverse three-dimensional products that are manufactured using two-dimensional cutting machines. Such products have a constant cross-section and are laterally invariant. FIG. 1 illustrates three examples of such 3D shapes. The direction which the cutting wire is applied is illustrated by an arrow.

The most common material for such products is foam. It is typically cut by wire cutters. Such foam products are prevalent in numerous everyday items. These include, for instance, household upholstery (chairs, sofas and mattresses), padded seats in vehicles, children's toys, and a plurality of domestic items.

In the final stages in production of foam, the liquid foam is poured into large rectangular molds, where it rises, then is allowed to polymerize and harden. The resultant large rectangular foam block, termed a "bun", which may have dimensions of 1×2×10 meters. The bun needs to be cut into many three-dimensional pieces of various thicknesses and shapes, to suit the size and shape of the end products, with as little waste of material as possible.

Challenges exits in optimizing the workflow in a production floor. It is necessary to design an optimal nest in which the varied shapes are arranged prior to cutting, with minimal surplus material. However, this does not override the need to optimize the time utilization of various additional machinery used on the production floor, and of the workforce available.

An additional complication in the decision making process related to the optimization of the assembly line, is the various due dates for assorted orders. For instance, while it may be advantageous to wait and combine more than one order into a single nest, thus saving material, one project may have a more urgent deadline than another. In another example, if all upper part of a single type of sofa are produced in one nest, then only several days later are all the lower parts are produced, the workforce may remain idle in the interim, as they are unable to begin assembling even a single sofa until all upper and lower parts are cut. If more than one job is mixed into a single nest, the workforce will need to spend time separating the items into correct batches each related to a single project, which may be time consuming and therefore more costly in labor costs than the savings in material.

In an example of optimization of the production floor, while utilization of material may suggest designing the nest by inserting a large number of small parts around the edges of larger pieces in the nest, the end result may be a surplus of these smaller parts if they are only needed for the present job in a relatively small quantity. The decision making process must weigh whether the storage costs for these smaller units outweigh the benefit of savings in material.

Cutting large blocks of standard unused raw material may be faster, as the cutting machine needs to be loaded only once. However, discarding remnants adds to overall waste. Certain odd shaped remnants may not be further cut by the machines available, and this must also be included in the workflow decision process.

In past, the workflow in a production floor for cutting and assembling three-dimensional products, was ordered intuitively by the floor manager, who would briefly consider due dates, two-dimensional nest design, machinery and workforce, then make a quick decision based on his experience, as to the order of production on the floor. This method may or may not have been cost effective, depending on the skill of the floor manager.

While over the course of years many different software products were created to design two-dimensional nests having the least waste of material, there is no software to date which takes into consideration any other parameters of the production floor, such as the due dates of various projects, availability of the workforce, length of time for running various machines, and formation of only those remnants shaped to allow further processing in the production floor. Additional parameters which have not to date been given sufficient attention are the real three-dimensional yield, obtaining optimal sizes of 3D blocks, and various additional manufacturing processes involved before a final product is produced (such as slicing or gluing smaller parts).

Prior art software solutions which could be applied to solve the problems described above include Enterprise Resource Planning (ERP) software which aims to track the business processes. Most ERP software primarily tracks inventory, jobs ordered and billing, but is not designed to make production floor decisions that would improve the yield or best utilize the production floor. ERP software lacks engineering information, such as geometric data, and data on relevant machinery characteristics. ERP is not designed to perform manufacturing tasks and therefore cannot aid in performing efficient production floor decisions.

While a customer may own business software, these typically monitor customer orders for complete products. There is little representation of the geometric shape of the individual pieces that comprise the product.

Additional prior art software products are engineering products for designing two or three-dimensional products, for example, CAD/CAM. CAD/CAM software rarely deals with specific customer orders. Rather, it includes diagrams of product parts including their geometric shape, the raw material from which they need to be cut, the characteristics of the machines on which they may be cut, and so on. No decision making options are available that would allow a user to best optimize the yield of a production floor. Nesting software is only available for positioning essentially two-dimensional nests and not for three-dimensional nests.

Prior art production decisions are disadvantageously sequential for each step in the production process. Raw material may be ordered in a specific quantity for a required arrival date, and while these parameters may be optimal for that specific step in the process, they are not necessarily optimal to ensure smooth flow with the remaining process steps. For instance, the storehouse may be full and unable to receive more raw material, even though a due date is looming and laborers are available to unload the material. While the best decision may be made for each step in the process, such sequential step-by-step decisions may not result in a smooth and efficient process. It is desirable to have a production planning software that can mathematically weigh the importance of each step in the entire process, and can provide an optimal smooth and efficient flow for a production plan, before any steps are taken to begin production.

Thus, there remained an unmet need for a higher level of production resource optimization by bridging the gap between software solutions from the Business category (e.g., ERP/MRP) and software solutions from the Engineering (e.g. CAD/CAM) category and their related processes and entities.

It is an object of the present invention to provide a software solution for optimizing workflow in a production floor which produces three-dimensional products. The software of the invention takes into consideration a wide range of parameters such as optimization of materials, availability of machinery, due dates, etc., and weighs the importance of these parameters before outputting a decision which includes one or more optimal nests and a production floor plan for optimizing work flow (machinery and workforce). Such a wide range of parameters have not previously been given consideration in any software of which the inventors are aware of for managing a production floor producing a three-dimensional product. These and other advantages will become more apparent in the Detailed Description herein below.

SUMMARY

The term "nest" in the context of the present invention refers to an arrangement of the pieces to be cut from raw material, and the term 'nesting' refers to the action of preparing a nest. In some industries, the synonym "marker" is commonly used in place of "nest."

The terms "work orders" and "jobs" are used synonymously to refer to specific customer orders which include various parts of final products, and which need to be cut from a three-dimensional material and assembled into a whole three-dimensional product. The parts are to be arranged in a nest using the software of the invention, prior to cutting, and the number of parts necessary is included in calculations performed using the invention.

The term "input parameters" refers to initial information necessary for design of a work schedule, for a production floor. Non-limiting examples include job data, due dates, product design data, production floor resources available (such as machines available, availability of personnel) and inventory data. Such input parameters are received by the software of the invention and utilized to calculate and display a highly efficient a production floor work plan schedule for production of three-dimensional products.

The term "output parameters" or "output" in reference to the work schedule, for a production floor producing three dimensional products, refers to the details of the work plan schedule, which make it the most efficient. The output includes for instance, decisions on optimal nests for best utilization of material; decisions on whether to include mixed jobs or not; cutting instructions including cutting axis for specific machinery, etc.

The term "three dimensional" product includes a product having width, depth and height. The majority of three-dimensional products produced using the invention may be manufactured using simple cutting in two different dimensions. In contrast, two dimensional products are essentially flat.

The term "production plan" used in reference to a production floor work plan schedule for production of three-dimensional products, refers to a schedule for best use of the machinery, personnel and raw materials, to maximize product created in the most cost-efficient manner. The schedule includes which machinery should be used first, which products should be created before others, which quantity, and the timing of each stage of operation. The schedule may include a schedule for ordering and receiving inventory; and may include best nests for the nesting three-dimensional products to maximize utilization of the materials without waste or excessive storage costs for unnecessary parts.

Consider a simplified example in which a nest for three-dimensional pieces is to be created, and the machine to cut the pieces and the machinist to operate the machine are assumed to be available.

Prior art software decisions typically relate to design of an optimal nest with the most saving of raw material. The scope of the present invention is far broader than mere nest design, and additionally includes for instance, optimization of machinery run-time, job deadlines, optimization of labor costs, etc. Nevertheless, a description and visualization of nest optimization, is now brought in relation to Prior Art FIGS. 2-3, to illustrate saving of materials that may be accomplished when a nest is optimized.

Referring to Prior Art FIG. 2, an example nest 1 comprised of three-dimensional pieces is illustrated. The outlines of the individual components, such as outlines 2, are oriented on a graphical representation 3 of a cube of material to indicate how to cut the components to provide highly efficient use of the raw material. Conventional manual and software-based methods and tools only exist for nesting of two-dimensional pieces, and not for three-dimensional pieces. The prior art algorithms available for this purpose use as input the length and the width of a sheet or roll of two-dimensional material, and the sizes and shapes of the individual panels. Algorithms also take into account various rules of placing various panels on the raw material, such as panel-tilting and gap restrictions. Despite the availability of such prior art nesting algorithms for two-dimensional products, less than optimal material use is still an issue, as shown in large area 4 in the sheet that is not used.

A human production manager must make decisions regarding other factors aside from "nesting-only" determinations. For example, if the production manager anticipates receiving at least four additional identical orders in the near future, he may decide to conserve resources for computing multiple new nests by reusing the same nest for each of the five orders as represented in Prior Art FIG. 3.

Referring to Prior Art FIG. 3, it is clear that the unused portion of raw material (area 4) is multiplied by five when five orders are processed instead of one, using the same single-unit nest four times.

If instead the production manager decides to combine ("merge") several different orders ("jobs") into a single production run (denoted "single" despite the fact that multiple individual sheets are used), savings in raw material use would be expected.

Referring to FIG. 4, combined orders result in use of three multiples of nest 5a (known also as the nest for the "merged job") and use of a single unit of nest 5b. Nest 5a has no remnants, and only four cubes of material were used in total as opposed to five cubes in FIG. 3, so the savings in material is clear. However, it may be time-consuming to thereafter separate the pieces into the various different orders.

The novel software of the invention weighs these issues and uses an algorithm to output a decision whether for instance, to proceed with mixed jobs or not.

Decision making is even more challenging when the pieces are three-dimensional, as the various shaped pieces may theoretically be placed in any three-dimensional orientation imaginable.

The present invention enables automated optimization of resource use in the manufacture of three-dimensional elements, by producing a production plan that concurrently accounts for the range of available resources and makes optimal use of them based on the manufacturers' goals and constraints. As the decision making is automated, many alternative resource allocations and their consumption may be considered to find a highly efficient solution. The invention may be embodied as a method, as a system, and as a storage medium containing instructions.

Regarding the method, the invention may be embodied as a computer-based method of combining customer order information with information about available resources and about product design to produce an efficient production plan for manufacturing three-dimensional elements. The method includes:

i. receiving input parameters comprising job data, due dates, product design data, production floor resources available and inventory data;

ii. maintaining in memory manufacturing rules and objectives, comprising one or more of: nesting restrictions, manufacturing limitations, material utilization rules, and machine run rules;

iii. assigning relative weights of importance to the input parameters and to the manufacturing rules and objectives;

iv. computing, based on the input parameters, on the manufacturing rules and objectives and on the relative weights of importance, a production floor work plan schedule for production of three-dimensional products for selected jobs associated with the job data, whereby a production order specifies for at least one given job, one or more nests and resources to cut the one or more nests and to produce a final three-dimensional product;

v. determining whether the production floor work plan schedule is efficient in utilization of materials and of the production floor resources available; if the schedule is determined to be efficient, outputting the production floor work plan schedule;

vi. if the computed production floor work plan schedule is determined to be inefficient, repeating steps (iv) and (v) until the production floor work plan schedule is determined to be efficient.

The invention also provides a computerized system for producing an efficient production floor work plan schedule for producing three-dimensional products, the system comprising:

an input interface configured to receive input parameters comprising job data, due dates, product design data, production floor resources available; inventory data and manufacturing rules and objectives;

a processing unit operatively connected to the input interface;

a storage unit operatively connected to the processing unit to store the input parameters; the storage unit also containing instructions that when executed by the processing unit cause the processing unit to:

i. receive input parameters comprising job data, due dates, product design data, production floor resources available and inventory data;

ii. maintain in memory manufacturing rules and objectives, comprising one or more of: nesting restrictions, manufacturing limitations, material utilization rules, and machine run rules;

iii. assign relative weights of importance to the input parameters and to the manufacturing rules and objectives;

iv. compute, based on the input parameters, on the manufacturing rules and objectives and on the relative weights of importance, a production floor work plan schedule for production of three-dimensional products for selected jobs associated with the job data, whereby a production order specifies for at least one given job, one or more nests and resources to cut the one or more nests and to produce a final three-dimensional product;

v. determine whether the production floor work plan schedule is efficient in utilization of materials and of the production floor resources available; if the schedule is determined to be efficient, outputting the production floor work plan schedule;

vi. if the computed production floor work plan schedule is determined to be inefficient, repeat steps (iv) and (v) until the production floor work plan schedule is determined to be efficient.

The invention also provides a non-transitory machine readable storage medium containing instructions associated with producing an efficient production floor plan for manufacturing three-dimensional products; the instructions when executed causing the following:

a. receiving input parameters comprising job data, due dates, product design data, production floor resources available and inventory data;

b. maintaining in memory manufacturing rules and objectives, comprising one or more of: nesting restrictions, manufacturing limitations, material utilization rules, and machine run rules;

c. assigning relative weights of importance to said input parameters and to said manufacturing rules and objectives;

d. computing, based on said input parameters, on said manufacturing rules and objectives and on said relative weights of importance, a production floor work plan schedule for production of three-dimensional products for selected jobs associated with the job data, whereby a production order specifies for at least one given job, one or more nests and resources to cut the one or more nests and to produce a final three-dimensional product;

e. determining whether the production floor work plan schedule is efficient in utilization of materials and of said production floor resources available; if said schedule is determined to be efficient, outputting said production floor work plan schedule;

f. if said computed production floor work plan schedule is determined to be inefficient, repeating steps (d) and (e) until said production floor work plan schedule is determined to be efficient.

BRIEF DESCRIPTION OF THE DRAWINGS

The present invention is illustrated by way of example in the figures of the accompanying drawings, in which like references indicate similar elements and in which:

Prior Art

Prior Art

FIG. 6 is an optimal set of nesting solutions for sheets of pre-sliced material, designed by the nesting module of the invention.

DETAILED DESCRIPTION OF THE INVENTION

Figure 1:
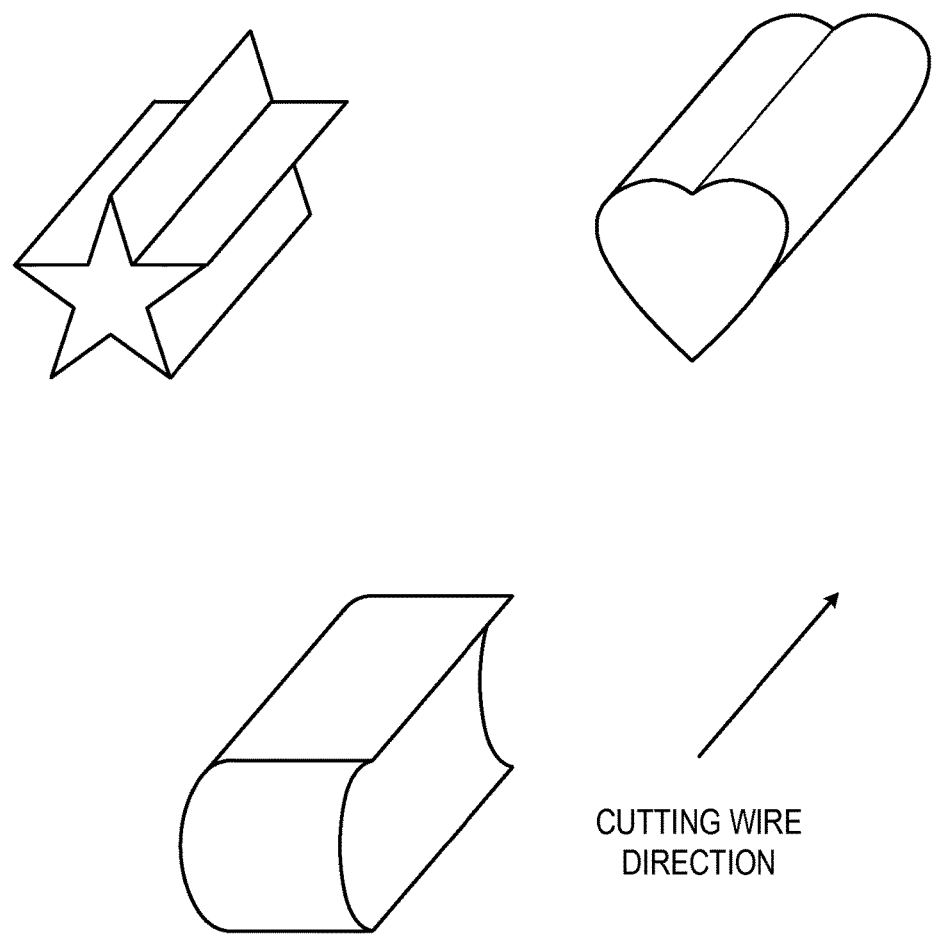
FIG. 1 illustrates various examples of three dimensional products manufactured using cutting machines which cut in two dimensions, which may be manufactured using the invention.
Figure 2:
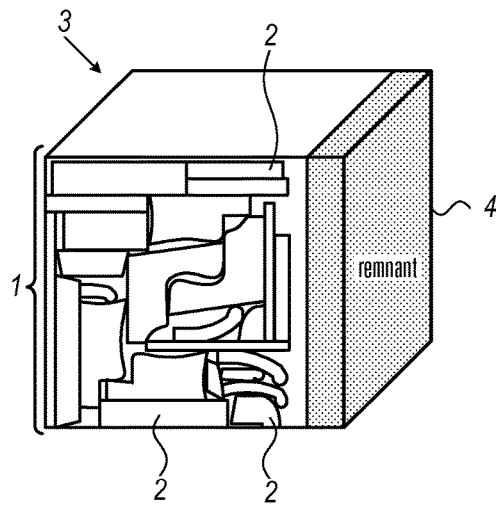
FIG. 2 illustrates, as background art, an example nest comprised of three-dimensional pieces.
Figure 3:
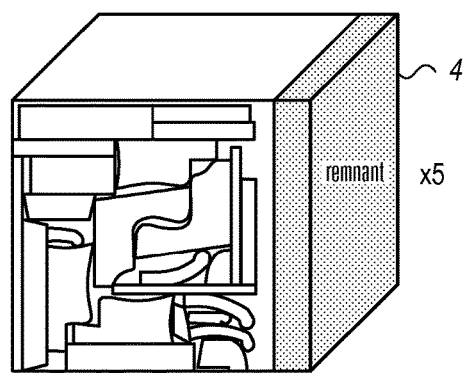
FIG. 3 illustrates, again as background art, a set of nests for five job orders of the type illustrated in FIG. 2 by using the same single-unit nest five times.
Figure 4:
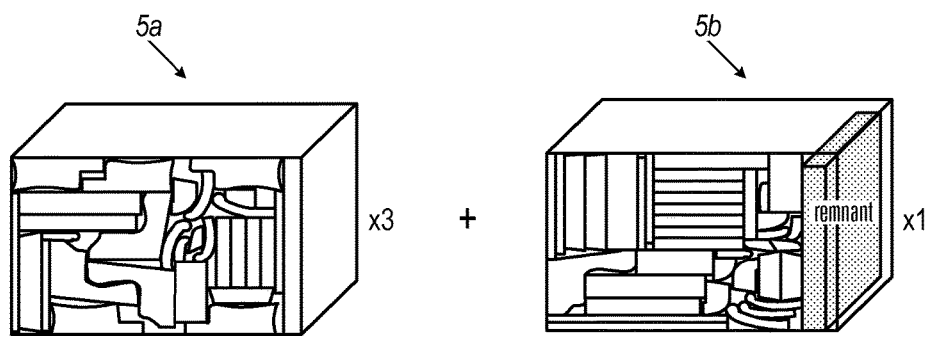
FIG. 4 illustrates a savings of raw material when the five jobs of FIG. 3 are reordered as merged jobs using three multiples of one nest, and use of a single unit of another nest.

In the following detailed description, numerous specific details are set forth in order to provide a thorough understanding of the present invention. There is no intention to limit the invention to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

In general, the invention provides a method and system for optimization of a production floor producing three-dimensional products, which weighs in labor costs, due dates, maximal material utilization, storage costs, optimal machine run-time, etc. herein termed "input parameters", and outputs an optimal production floor workflow plan. The method and system are based on algorithms that assign relative weights to the various input parameters depending on their importance. After several workflow options are algorithmically run, the method outputs at least one option for best design of one or more nests for cutting one or more three dimensional products, and for a most efficient workflow for the production floor. The invention weighs, for instance, the benefits of mixing more than one product within the nest, as compared to the disadvantages in terms of separating and storing excess parts produced. Additionally, the nests are designed so as to avoid creation of odd-shaped remnants which would need to be discarded.

The present invention provides a single software and system that has not previously been described that can both provide optimal three-dimensional nests and can run a production floor in a most efficient manner.

The present invention may be used to design optimal and most cost efficient cutting and production of any three-dimensional product, especially those which are cut from a large block of three-dimensional material. However, the scope of the invention is not limited to a particular material, or to products which are thus cut.

Figure 5:
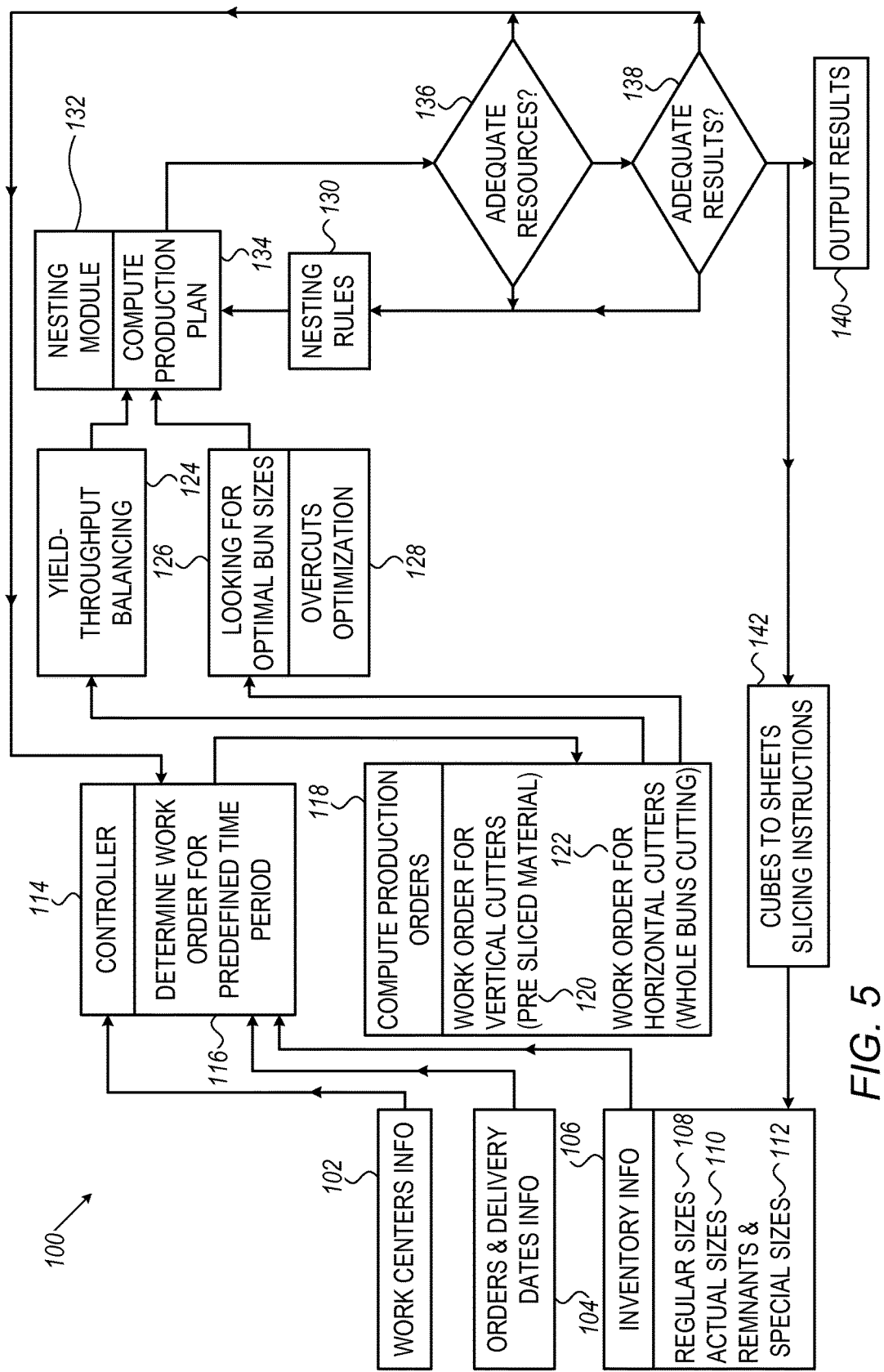
FIG. 5 is a flow chart overview of the method of the invention for optimization of workflow in a production floor for production of a three-dimensional product.

Referring now to FIG. 5, a high-level flowchart 100 is shown describing an overview of the method of the invention. The left hand side of the flow-chart lists the various input parameters which make up the work order specifics for various jobs that need to be sent at a given time, to a production floor.

Initially, work center information 102 is selected from a drop-down menu, this denotes which production facility in a large organization is appropriated for the job at hand.

The parameters of orders and delivery dates 104 are inputted. Order particulars include: the quantity of an order, selection of a specific type of material and geometry of individual parts that make up each product, the nesting restrictions (permitted rotations, flip, needed gap), min-max quantity of each piece (lower- and upper-bound thresholds for any given piece quantity), manufacturing limitations (whether piece gluing is permitted or not). Order particulars may also include customer contact information, and specific requests made by a customer.

Inventory information 106 is included in the input parameters. Inventory information may be automatically adjusted by the software at the end of a production run on the production floor, to delete materials used during the latest run. The inventory information 106 includes "regular sizes" 108 of material, which in foam products refers to one or more commonly found sizes of foam buns or cubes, while any small bun size fluctuations are ignored. In contrast, Actual sizes 110 of materials in inventory, refers to carefully measured bun sizes. Special sizes and remnants 112 are included in the inventory list, as the software of the invention is novel in allowing reuse of odd-shaped remnants of material, which have been discarded in prior art. This is enlarged upon in relation to FIG. 7 below. Special size materials 112 are standard sub-buns that are used by the software of the invention in order to improve the overall performance.

The controller 114 running the software of the invention assesses the various due dates at a given date, for all work orders, in order to determine which order has a more urgent due date 116, and whether to produce mixed nests including more than one job order. For instance, if one job is far more urgent or more time-consuming than another, it may be necessary to design only those nests necessary for the urgent or time-consuming job, while delaying production of other jobs.

Once the decision is made as to the schedule for production of the various orders (e.g. begin X order this week, delay Y order till next week), the nests are designed in block 118 "compute production orders". As the invention pertains particularly to production of material which is cut from three-dimensional blocks, such as from foam buns, these work orders define whether to utilize "pre-sliced" material on vertical cutting machines 120, and/or to utilize horizontal cutting machines on the entire whole bun 122, described in further detail in relation to FIG. 6-7 below. These decisions are also based on the presence and availability of any of these machines.

The yield throughput is balanced 124 to review rules related to specific machinery necessary for each job, as well as labor costs involved. Non-limiting examples of yield throughput rules may include: only run machine X at night to conserve energy, only run machine X for a predefined amount of hours, only run machine X if a predefined amount of job orders have accumulated, define job X to be run during night shift, define job X as being of low importance.

The software simultaneously searches for optimal three-dimensional bun sizes 126 that will give optimal three-dimensional nests, and searches for optimal three dimensional yield.

The software searches for an optimal three-dimensional nest or nests for best utilization of materials, which includes looking for optimal bun sizes 126 and overcut optimization 128 to include small parts in the periphery around large parts, to as to avoid waste of material.

This search for utilization of materials includes looking for optimization of overcuts 128 (excessive ending portions of nested part tubes, which would represent a waste of material). Another example relates to usage of specially ordered sub-buns that will improve the yield and quantity of remnants, but may slow down the production rate. The software must weigh between the material yield and total plant throughput.

The plant resource load is estimated 124. In case of any machine/resource overloading, the load must be rebalanced and machine usage must be re-estimated and improved. The material and machine allocation is re-calculated 124 while the material yield must be as high as possible.

Non-limiting examples of yield—throughput balance may include: move specific jobs to smaller machine that are available, that could not cope with previously chosen optimal bun size.

Nesting Rules 130 may include for instance, a rule to avoid production of certain odd-shaped remnants which cannot be further processed. Another example of a nesting rule is to avoid nesting the parts in a three-dimensional placement that would lead to undesired shifting or sloughing off during cutting. The Nesting Rules determine and optimize usage of additional (optional) parts, so as to improve the yield and minimize creation of remnants that would go to waste. The Nesting Rules distribute the parts between different faces present on each cube.

Numerous potential nests are computed by the Nesting Module 132, which compares the benefits of running each nest as opposed to the cost in labor, raw materials and run-time. After detecting the resultant ideal nest which is most efficient, the production floor plan is computed 134, so that the nests and production steps are scheduled and assigned to various machinery and personnel at the ideal time-slot.

The software performs a check to ascertain sufficient resources are available 136, such as raw materials, availability of machinery and personnel, and if the response is negative, the production plan is sent back to work around the deficiencies. This may be performed by rescheduling one or all of the work orders included in the various jobs using Controller 114, by re-computing the production plan 134 to send the nest to other machinery or personnel available, or by preparing alternative nests using the nesting rules 130 and the nesting module 132.

The expected results are analyzed for efficiency, and if determined to be of adequate standard 138 of efficiency, the production plan is sent to the production floor, shown as "output results" 140 and "Cubes to Sheets Slicing Instructions" 142.

If the results are deemed inadequate (block 138), according to a predefined efficiency standard, the production plan is not utilized and the analysis process is run again (beginning with the nesting rules module 132, or the controller 114 to reschedule jobs).

This efficiency check is one of the points of novelty of the invention, as prior art production planning software and prior art nesting algorithms did not check more than one production solution for each production run, and did not attempt to ascertain that the most efficient option was found.

In contrast, the software of the present invention includes several checkpoints where feedback is given, so that if efficiency is deemed to be below par, different production plans are analyzed. Examples of feedback points are seen in FIG. 5 in the existence of arrows returning towards the beginning of the flowchart, in the following steps: "adequate resource" 136 block, "adequate result" block 138, "nesting rules" 130 block, and "cubes to sheets slicing" 142 block.

Any remnants remaining after cutting and production are added to the inventory 112, and the material utilized is depleted from inventory data 106.

A computer used in this embodiment receives, produces and stores data needed to implement the various steps of the method. The data include the details of customer orders, product design, manufacturing resources, and manufacturing rules and objectives. The terminology "customer order" is also referred to sometimes as a "job." The term "job" can also refer to a set of customer orders that have been consolidated to be processed together. Thus, data including details of customer orders can be referred to as "job data." As discussed below, jobs can later be merged by the embodiment to improve production efficiencies. The job data include for each ordered job the product to make, its special requirements (for example, customer-specific sizing of a product, specific quality characteristics, or special quantities), the types of materials to use for making that product, the due dates, and other information. The product design data includes at least a listing of the parts that compose the product and its optional variants/additions, exact geometric definition (shapes and sizes) of each such part (including three-dimensional graphic depictions of the product and parts), manufacturing restrictions for the product and/or any specific part that makes it (such as cutting and assembly restrictions), and material requirements, The resource data in this embodiment include—among others—descriptions of the inventory of raw material and the machines available for cutting the nests. Human resource data, for example, labor costs, may also be included. The rule and objective data specify manufacturing constraints, which may be uncompromising or flexible. An example of an uncompromising rule may be "material thicker than 200 cm is not cut by machine A." This rule cannot be changed because of mechanical limitations of the machines. Flexible rules can be changed at management's discretion. Examples of flexible rules include "No more than two jobs are merged," "Send as many as possible jobs to machine A" (because of its higher quality cutting), and "Use material B whenever possible." Examples of objectives (akin to goals) are "Finish as early as possible" and "Use as little material as possible" with the provision that, in the event that these objectives conflict, a solution is selected that best balances the objectives based on the manufactures priorities at any given time. As discussed, the present embodiment (and other embodiments) "transforms" customer orders (jobs) into production orders in an efficient way, effectively bridging the gap of services provided by ERP and CAD utilities, on the production floor.

Referring to FIG. 6, an example is shown of use of the Nesting Module of the invention to design an optimal set of nesting solutions for sheets of pre-sliced material. Such "Pre-sliced" material is typically used when relatively small quantities of each part are desired; only then is pre-sliced material more efficient, since otherwise, cutting of entire large bun would create many useless part overcuts. Each sheet is pre-sliced horizontally to the exact thickness of the respective nested component.

During actual cutting of the foam on the production floor, horizontal slicers are typically employed to pre-slice the buns in the horizontal plane, as shown in FIG. 6, followed by vertical cutters which will cut out the individual parts according to the desired shapes shown in the nests. The system looks for optimal bun sizes when several jobs share multiple buns, in order to achieve better yield, throughput and smaller remnants.

Figure 6A:
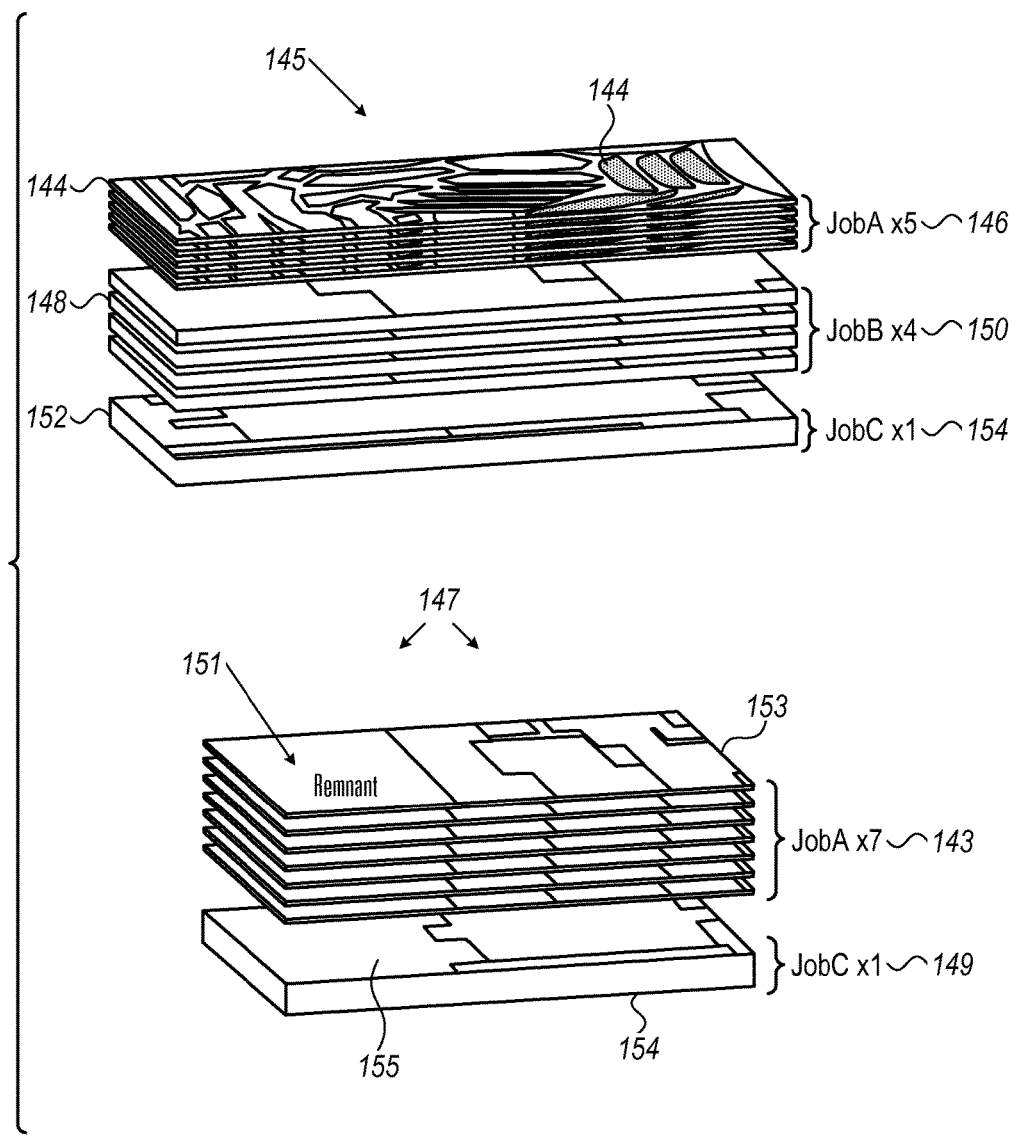
FIG. 6A is a side-view and FIG. 6B is a view from above.

In FIG. 6A, mixed jobs are nested on the top stack of pre-sliced material sheets, and are to be cut vertically.

One large size bun of foam 145 and one small sub-bun remnant 147 will be cut for 3 different jobs using 5 different nests (146, 150, 154, 143, 149).

The upper nest 144 for Job A, appearing in the upper third of FIG. 6A, is replicated 5 times, indicated by "Job A×5" with reference numeral 146.

Upper nest 144 includes parts for more than one product, as shown by differing shades of gray of individual parts.

Center nest 148 is replicated 4 times, as indicated 150 (Job B×4).

Lower nest 152 appears only once in the bun.

Note that the width of the upper nest 144 is about half of the width of center nest 148, and the width of lower nest 152 also differs from that of the other nests (148 and 144).

Jobs A and C are continued in small sub-bun 147 with various stacking quantities and nests 153 and 154.

The Nesting Module of the invention has thus determined the most efficient design of nests to utilize all areas of the bun with minimal waste, while taking into account the various depths of the individual parts required, and the quantity of such parts.

Figure 6B:
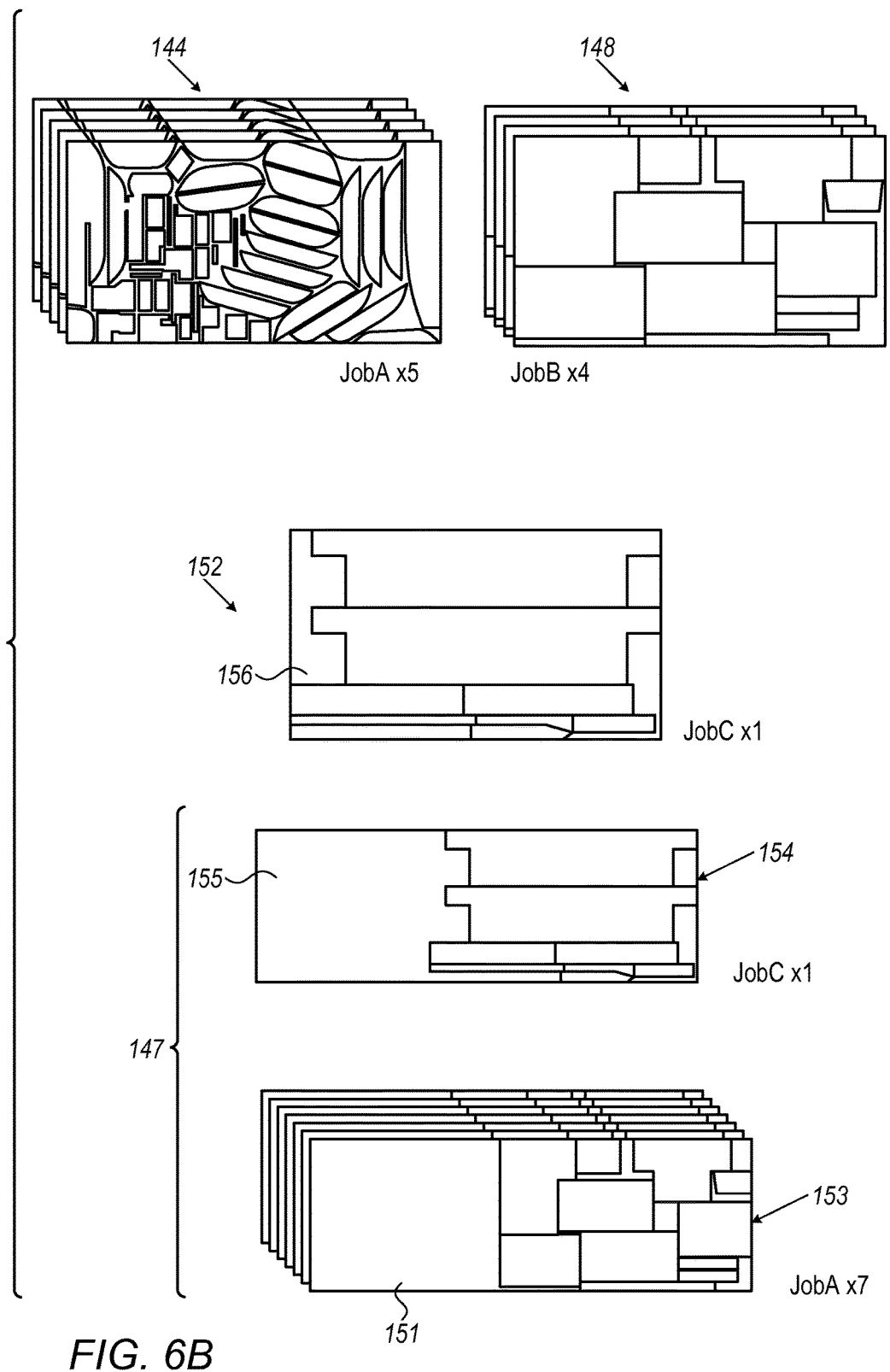

Referring to FIG. 6B, nests 144, 148 and 152 are shown as viewed from above. After horizontal cutting has been performed, vertical cutting will take place.

Note that area 156 of lower nest 152 may be utilized for overcuts (in which optional parts, or parts from other jobs, are placed in underutilized areas of a nest), when deemed cost efficient. Similarly, areas 151 and 155 of sub-bun 147 are shaped to be relatively "squared off" so that they may be saved for further use.

The innovation thus is described as being "Many to Many": multiple jobs can be allocated to multiple buns, as opposed to prior art "One-to-One" or "One-to-Many" solutions. In addition it includes bun size optimization.

Figure 7:
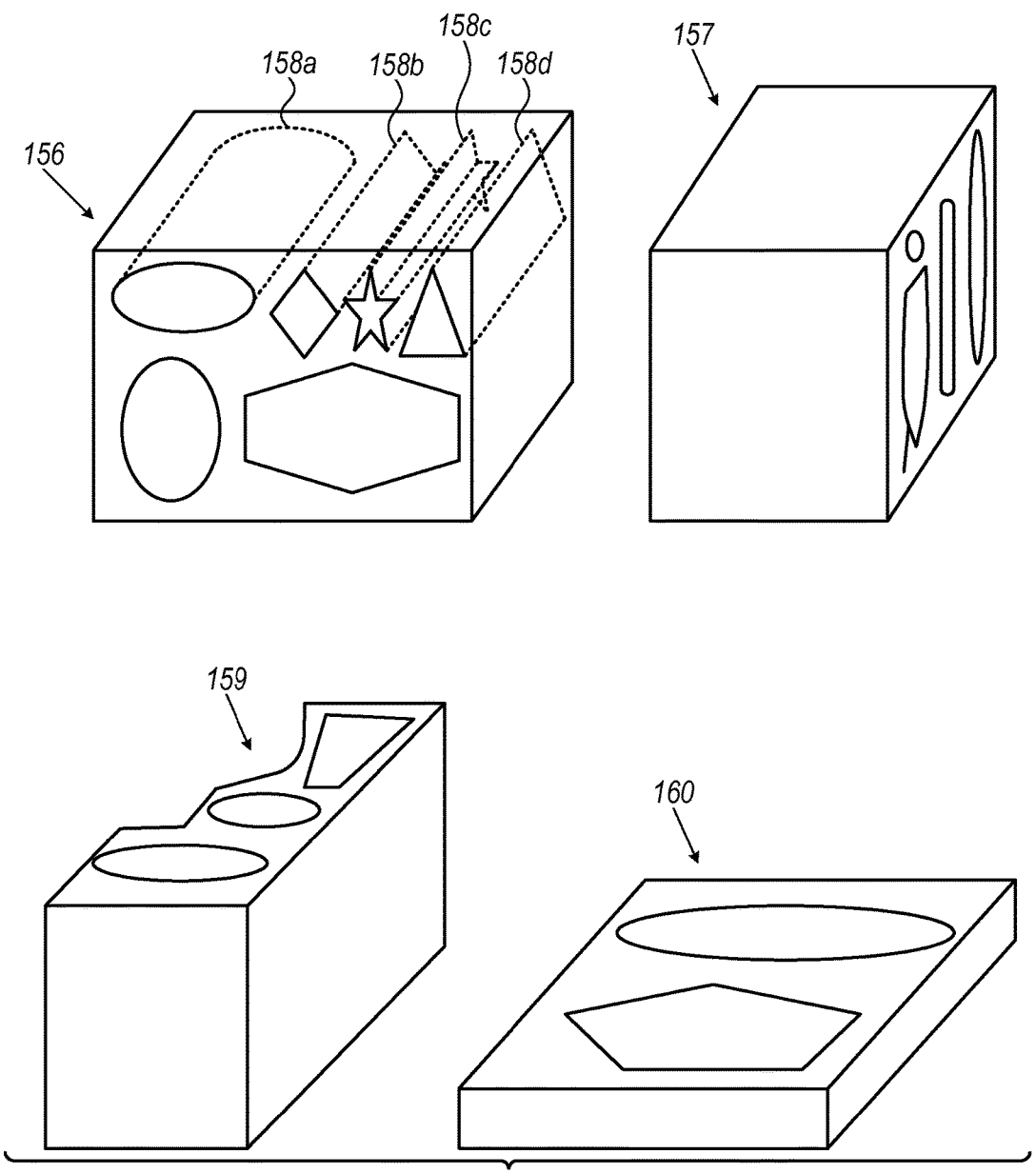
FIG. 7 illustrates an optimal set of three dimensional nests for post-slicing of a large foam bun, as designed by the Nesting Module of the invention.

Referring to FIG. 7, the Nesting Module of the invention is used to design an optimal set of three dimensional nests for post-slicing of a large foam bun.

A cutter cuts through the whole bun to create long tubes of material, and only afterwards each obtained tube is sliced separately to any desired thickness. In post-slicing, parts with non-equal thicknesses may be mixed together without limitation. Post-slicing results in maximal utilization of material, as it allows placement of parts in any spatial orientation in the three dimensional Cartesian coordinate system.

The optimization of material and production plan in this scenario is much more complicated due to a significantly larger number of input parameters. The system still looks for optimal bun sizes, but now the optimization includes: adding buns with special sizes intentionally created for this project, choosing of an optimal pane of each bun for the nesting, while taking into consideration the 2D-yield as well as the real 3D-yield, creation of remnants which can be reused, and the costs of: cutting, post-slicing to single parts and part gluing.

Prior art software solutions solved this multi-parameter optimization problem by very greedy one-parameter sequential optimization approach, where decisions were made to optimize each step, regardless of the factors considered in the subsequent steps, thus limiting the possibilities to reach an overall optimal solution. The following describes common prior art manufacturing practice:

(1) Order material buns with a standard size—typically best available for cutting throughput, but not for anything else.
(2) Choose jobs for next manufacturing time period—optimally for due dates and legal for throughput limitations, but not for anything else.
(3) Add all stored material remnants—optimally for inventory space limitations, but not for chosen jobs and throughput limitations.
(4) Nest the chosen jobs on the chosen materials, standard and remnants. Depending on factory policy—material yield or machines throughput is optimized; not both of them.
(5) Only 2D-yield is fully considered; exact considering of real 3D-yield is almost impossible due to two-dimensional essence of the software.

In contrast, the software of the invention looks for production plans that simultaneously optimize all involved parameters, for example:

(1) The jobs include some with later due dates; they are considered as optional and should improve yield, remnants handling and throughput.
(2) All available materials and their actual sizes are considered. Nesting is performed on all bun panes. For each nested part, the true 3D yield is taken into consideration together with the cost of post-cutting operations (slicing and gluing).
(3) Since it is significantly slower to cut a special size or odd-shaped remnant, than to cut a larger new material, the efficiency of utilizing remnants of stored material is considered. It may nevertheless be cost efficient to utilize remnants when the lower expected 2D-yield is considered, the avoidance of overcuts that may be generated when new material is used, and the elimination of further storage costs for the remnants.
(4) Nesting on purposefully ordered specially sized sub-buns is considered in order to minimize overcuts and to minimize creation of new remnants. Excessive costs such as rush material ordering and future inventory expenses, may counterweigh and limit this usage.
(5) An additional degree of freedom may be available. The raw material may come in very long buns that could be sliced to much shorter buns in order to make machine cutting possible. The invention enables finding optimal fragmentation of the long bun, to groups of cuttable buns, which are varied and are optimally sized.

Referring to FIG. 7, the inventors have now algorithmically determined that the most efficient yield of a bun 156 is achieved when nesting is performed on the front pane, and horizontal cutting will form sets of lengthened tubes of foam 158a, 158b, 158c, 158d. In a subsequent step, post-slicing is performed on the lengthened tubes in the vertical plane, perpendicular to the direction of the first primary cut, to cut lengthened tubes 158a,b,c,d into smaller parts having predetermined thickness.

The next bun 157 is nested on the side pane. Different pane dimensions and corresponding bun thicknesses influence the bun and pane choice.

The odd-shaped remnant 159 would either have been discarded entirely in prior art, or the left half would have been cut off and discarded leaving a smaller flat rectangle which could be utilized. In contrast, the invention allows use of the entire volume of this odd-shaped remnant 159, representing a savings in material.

The final bun 160 did not exist in the inventory. The Nesting module of the invention estimated its size in order to minimize overcuts and prevent formation of new remnants.

Figure 8:
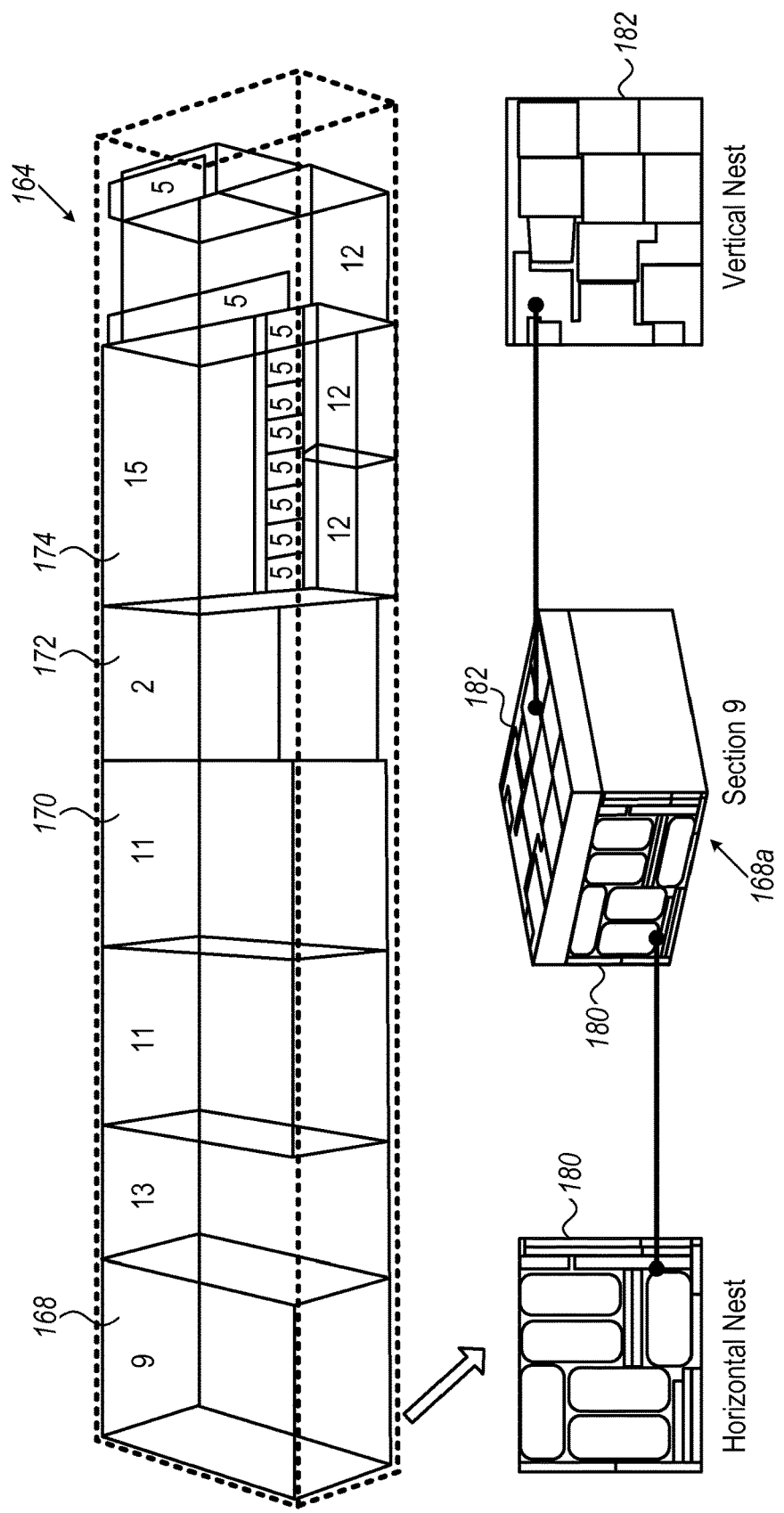
FIG. 8 illustrates an optimized nesting design for a large foam bun using the nesting module of the invention, for maximal utilization of material.

Referring to FIG. 8, an optimized nesting design is shown for large bun 164 using the nesting module of the invention, for maximal utilization of material. Each section 168, 170, 172, 174 is utilized for another nest, which may include mixed jobs (for parts from various customer orders for different products).

Section 168 is shown in perspective view 168*a* (below, center) to be utilized for both a lower horizontal nest 180 which utilizes approximately ⅔ of the material in this section 168, and for an upper vertical nest 182 which utilizes the remaining ⅓ of the material in this section 168.

Figure 9:
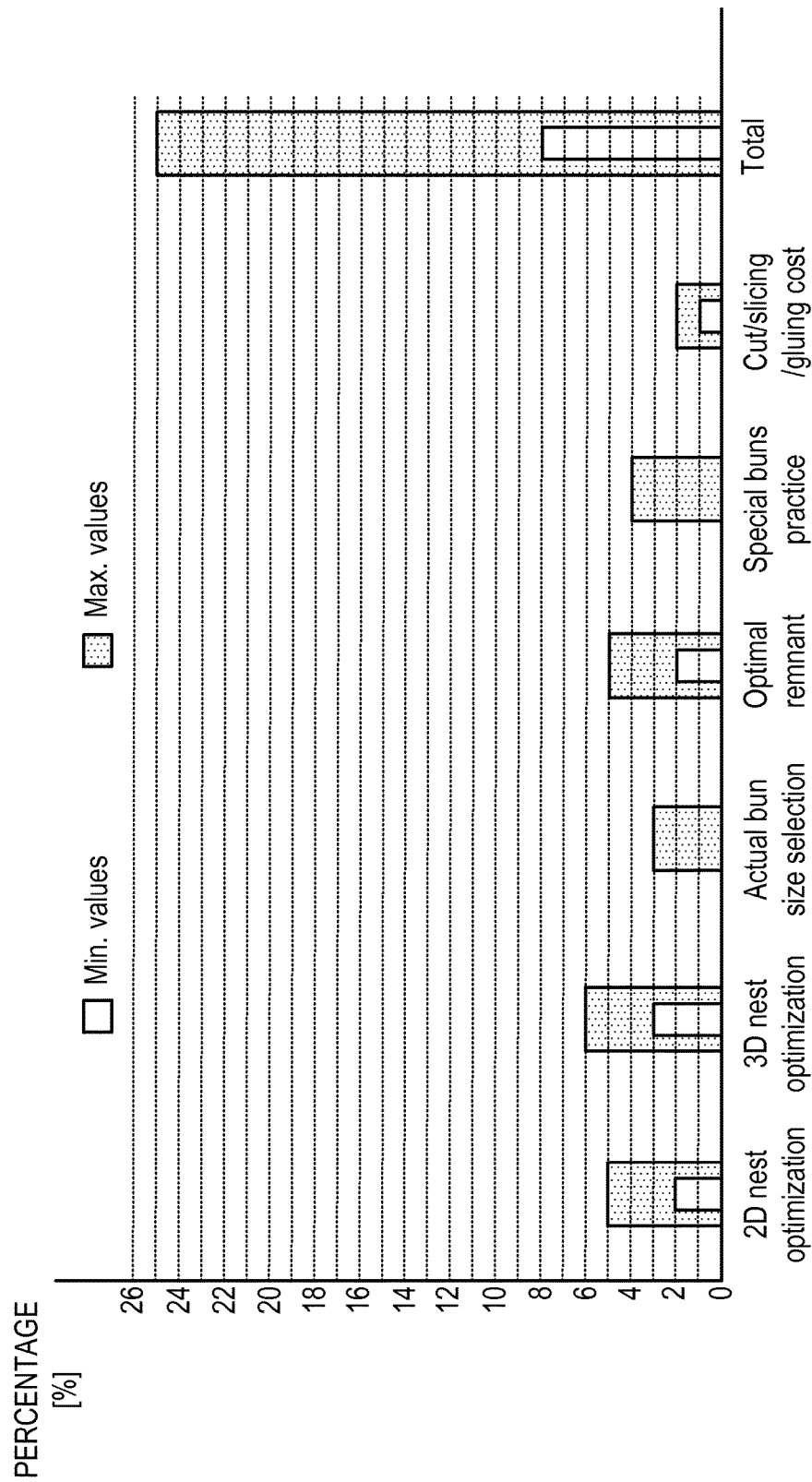
FIG. 9 presents tangible manufacturing savings achieved by the current invention.

Referring to FIG. 9, manufacturing savings achieved by the current invention is presented. The inventors have observed that in the case of production of products essentially made of foam, more than 50% of all production costs originate in the raw materials. In a typical midsize factory 10-20% material savings will results in a gain of 1-2 million dollars per year and will be highly significant in the fiscal success of such a factory. Tangible manufacturing savings results may be seen in the columns of FIG. 9.

A production order in the invention specifies for at least one given job a nest and resources to cut the nest. In some implementations, the resources specified in the production order to cut the nest include at least one unit of material from which to cut the nest and at least one machine to cut the nest. A "unit" of material in this case refers to a specifically-identified piece of raw material, such as a cube or bun of material identified by a serial number on a bar code label affixed to the cube or bun.

As stated above, the production orders are computed only for "selected" jobs, as opposed to computing them for all jobs. An example of selected jobs is only those jobs which are due in five days or fewer, if a business rule dictates that jobs due after five days will not have production orders computed for them.

A production order is computed by considering multiple factors. In the present embodiment, the software considers which of the available machines to use for a given job (for example, the one that uses the least electricity or the one that is fastest), which unit or units of material to use (for example, which buns, cubes, or remnant thereof), and which nest to use for a particular machine and material, as an efficient nest for one machine/material may not be so efficient or even possible to use on another machine/material. The nest may not be possible to use on a different machine if, for example, the nest requires a unit of material that would not fit on that machine. For each job, multiple "tentative" productions orders are considered before a single production order for the job is output. The goal is to select the most efficient production order for the given job, or set of jobs. Efficiency of a production order may be judged based on multiple criteria, for example, material yield, execution time, and machine operation costs. Often, these criteria may conflict with one another, requiring the selection process to balance the various criteria against the definition of "most efficient" as defined in the production objectives set in the system. (Note that, although a production order for one job may itself be efficient, executing the production order may require that production orders for other jobs will be less efficient. Thus, subsequent steps of the present method as explained below determine whether the individually-computed production orders are desirable for use in an overall production plan.)

The memory (or "storage") used to store the manufacturing data is generally non-volatile, such a personal computer's hard drive, but the embodiment is not necessarily limited accordingly. Data may be entered via a personal computer's keyboard or through data-transfer from an adjacent system, such as the customer-order management system or the Enterprise Resource Planning (ERP) system, and become available for use while still in a volatile RAM. The data are nonetheless maintained in a memory.

Figure 10:
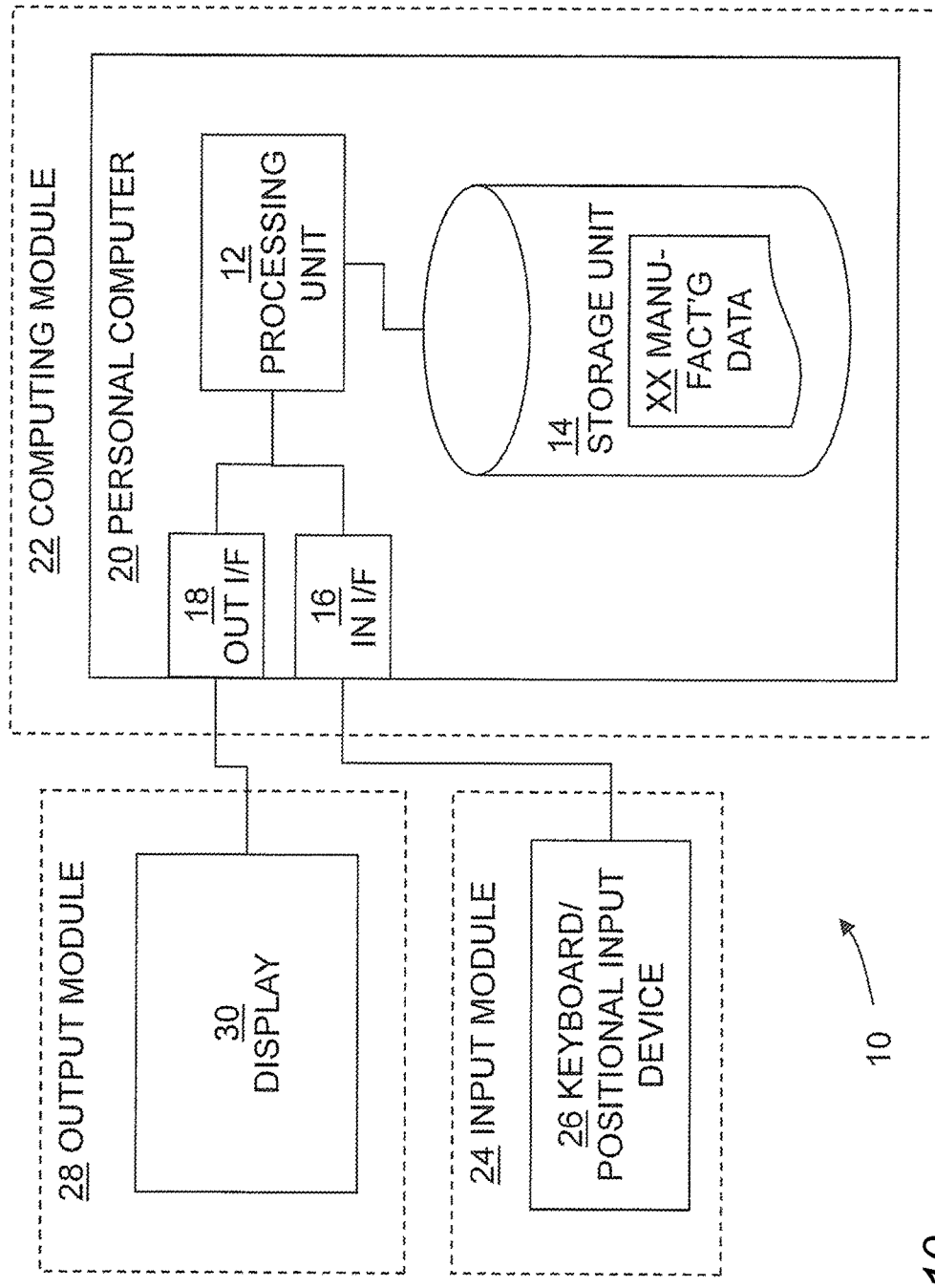
FIG. 10 illustrates components of the computerized system of the invention.

Referring to FIG. 10, the computerized system 10 includes a processing unit 12, a storage unit 14, an input interface 16, and an output interface 18. In this embodiment, these components are part of a personal computer 20, and they form a computing module 22. The components instead may be part of a workstation, PDA, or smart phone as non-limiting alternative example embodiments. As a further alternative, a computing module may be part of a machine that cuts nests of three-dimensional elements.

The input interface 16 of the computerized system 10 is configured to receive manufacturing data that include job data, product design data, resource data, rule and objective data, and that manufacturing data is stored in the storage unit 14. The input interface 16 may for example include a USB socket of the personal computer 20. The input interface 16 may alternatively receive input from an entry device, such as a keyboard, and/or adjacent computer systems, such as Enterprise Resource Planning (ERP), and computer aided design (CAD) software. As shown, the computerized system 10 includes an input module 24 that is configured to transmit to the input interface 16 a user's input as the manufacturing data. For that purpose, the input module 24 includes a keyboard and/or a positional input device 26, which may connect to the personal computer 20 through the USB socket. The positional input device may be a mouse, a trackball, or a touchpad as non-limiting examples. In addition to a keyboard or positional input device, the input module 24 may include any other equivalent means for transmitting a user's input to the input interface 16.

The output interface 18 of the computerized system 10 is configured to transmit signals that indicate a cutting sequence and resources to use for cutting nests as determined by the computerized system 10. The output interface 18 may for example include a VGA connector of the personal computer 20. As shown in FIG. 10, the computerized system 10 includes an output module 28 that is configured to receive the signals from the output interface 18 to indicate the output variable to the user. For that purpose, the output module 28 includes a display 30 for the user to visually observe the output variable. The display 30 may connect to the personal computer 20 through the VGA connector. In place of or in addition to the display 30, the output module may include any other equivalent means for receiving the signals from the output interface 18. For example, the use of an output device that is designed for visually-impaired users is within the scope of the invention. Also, the output device may include a printer. In alternate embodiments, the output interface 18 may send signals to machinery operative to cut nests of three-dimensional elements. Examples of such machinery include wood-cutting routers, foam or fabric-cutting machines, and metal-cutting machines of various technologies, all of which can receive signals that indicate cutting instructions.

Referring still to FIG. 10, the processing unit 12 is operatively connected to the input interface 16, the output interface 18, and the storage unit 14. The processing unit 12 executes instructions contained in the storage unit 14. The instructions, when executed, cause the processing unit 12 to:

(1) compute, based the resource data and the rule and objective data, production orders for three-dimensional elements for selected jobs associated with the job data, whereby a production order specifies for at least one given job one or more nests and resources to cut the one or more nests; (2) compute, based on the resource data and the rule and objective data, a production plan for the production orders, whereby the production plan schedules execution of the production orders; (3) determine, based on the resource data, whether the computed production plan requires more resources than are available; and (4) modify the rule data maintained in the storage unit 14 and repeat the preceding instructions, if more resources than available are determined to be required.

As non-limiting examples, the processing unit 12 of system 10 may include an Intel Pentium Processor E5400, an Intel Xeon 5130 CPU, or any other equivalent means for processing (executing) instructions contained in the storage unit 14. Also as non-limiting examples, the storage unit 14 may be SATA hard drive, a flash memory SSD, or any other equivalent means for storing instructions that when executed by the processing unit 12 cause the processing unit 12 to function as described above.

The embodiment of FIG. 10 may be modified to allow a user to interact with a computing module through a network. As non-limiting examples, the network may be a local area network (LAN) within an office environment or alternatively the Internet. An alternative embodiment may implement a "hosted" architecture for the computing module, whereby the algorithmic calculations are done in a remote data-center (server farm) accessible over the network/Internet. Another alternative embodiment may implement a cloud computing configuration for the computing module. Thus, a user may interact with the computing module using a Microsoft® Windows-based utility or a web browser, as non-limiting examples. Examples of such modified systems are shown with reference to the block diagram in FIG. 11.

Figure 11:
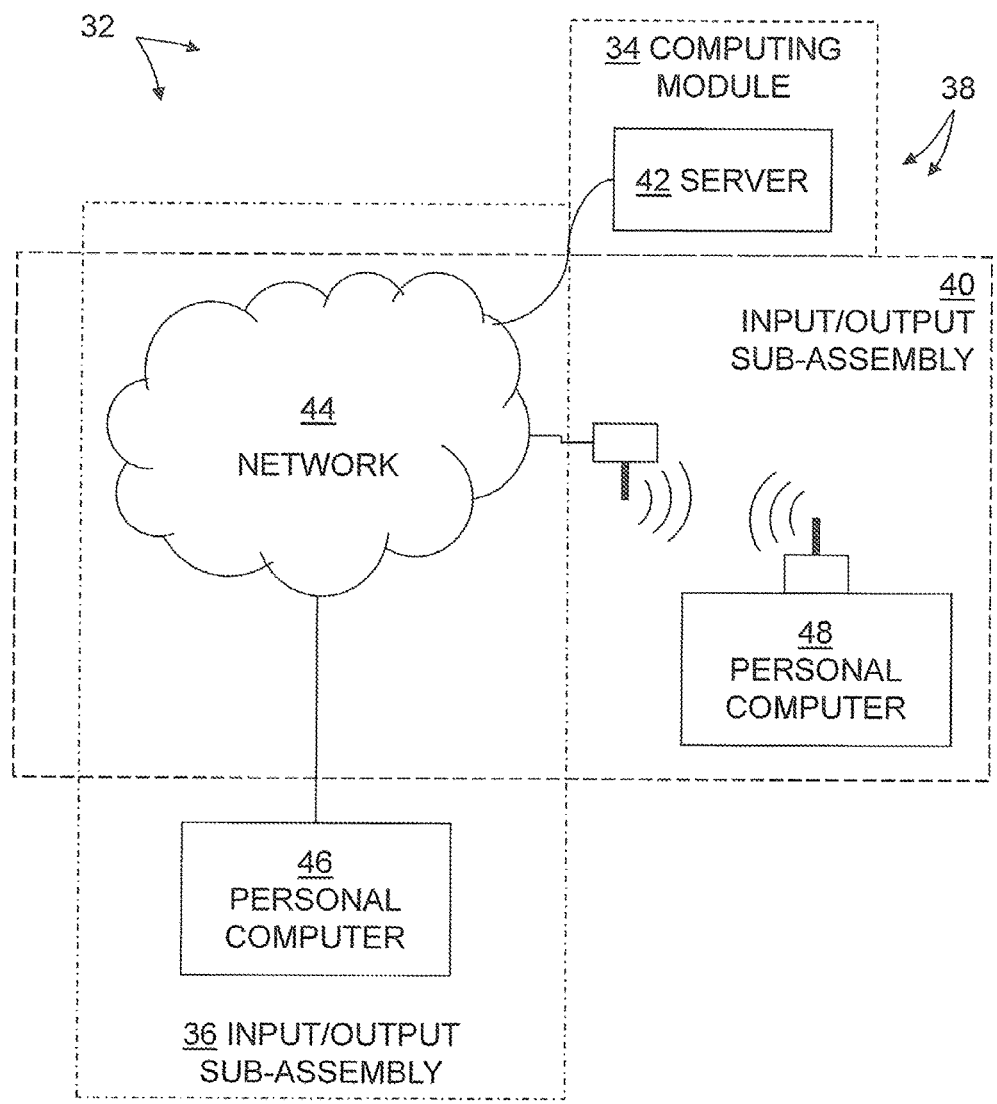
FIG. 11 illustrates additional components of the computerized system of the invention.

As shown in FIG. 11, the network 44 is part of both the input/output sub-assembly 36 and the input/output sub-assembly 40. Both input/output sub-assemblies 36, 40 are configured to transmit through the network 44 to the input interface of the server 42 user inputs as the signals indicating the values of the input variable(s). Both input/output sub-assemblies 36, 40 are also configured to receive signals from the output interface of the server 42 through the network to indicate the output variable to the user. Users may interact with the server 42 using a personal computer 46 of the computerized system 32 or using a personal computer 48 of the computerized system 38. The personal computer 46 communicates with the network 44 via a wired connection, and the personal computer 48 communicates with the network 44 via a wireless connection. Besides input/output subassemblies 36, 40 using personal computers with wired and wireless connections to the network 44, the input/output subassembly can instead be any other equivalent means for transmitting/receiving signals through/from the network 44.

The invention may also be embodied as a storage medium (or "memory"), such as the storage unit 14 in the system 10 of FIG. 10 that contains instructions associated with combining customer order information with information about available resources and about product design to produce an efficient production plan for manufacturing substantially three-dimensional elements. The instructions, when executed, perform the method associated with the flowchart provided in FIG. 5.

The method, system and machine readable storage medium and the ready to cut production plan provided according to the invention can be used by foam manufacturers.

In one embodiment, the method and system bridges the gap between ERP/MRP, CAD and the production floor.

A ready-to-cut production plan is provided, according to one embodiment of the invention, by retrieving critical information from both the ERP/MRP and CAD systems and, optionally, selecting the buns or cubes to be used. For example, work orders, their due date and production quantities as well as inventory information such as material dimensions can be retrieved from the ERP/MRP, while engineering data can be retrieved from CAD files. A sophisticated algorithm can then automatically produce a complete and optimized three-dimensional production cut plan which dynamically creates optimal nests.

The method and system enables significant cost savings and increased productivity through automation and optimization due to: higher material utilization; increased foam-cutter throughput (both horizontal and vertical cutters; Optimized inventory management including methodical use of remnants; and automating routine manual tasks and eliminating associated errors. The system automatically decides which production order to run, when, using which material, on what machine, while creating optimal nests.

The system can automatically and optimally utilize odd shaped remnants.

Having described the invention with regard to certain specific embodiments thereof, it is to be understood that the description is not meant as a limitation, as further modifications will now become apparent to those skilled in the art, and it is intended to cover such modifications as are within the scope of the appended claims.

The invention claimed is:

1. A computerized method for optimization of efficiency of a production floor to produce three-dimensional products by cutting a three-dimensional block of material via three-dimensional nesting, said method comprising:
   a) receiving input parameters comprising: job data, due dates, product design data, production floor resources available and inventory data;
   b) maintaining in memory manufacturing rules and objectives, comprising material utilization rules, and further comprising one or more of: nesting restrictions, manufacturing limitations, and machine run rules;
   c) wherein said material utilization rules for utilization of said three-dimensional block of material, comprises:
   rules to avoid creation of unnecessary surplus parts;
   rules to avoid creation of odd-shaped remnants;
   rules for selection between use of pre-sliced material or use of large blocks of material to be cut by horizontal cutting machines; and
   rules for selecting an optimal nesting pane upon a large block of material, wherein the optimal nesting pane involves rules for selecting between pre-slicing and post-slicing of said large block of material,
   wherein said pre-slicing comprises cutting the large block of material in a horizontal plane into a plurality of sheets, generating nests upon said sheets, followed by vertical cutting to produce the three-dimensional products, and
   wherein said post-slicing comprises cutting the large block of material in a first direction to create lengthened shapes, followed by cutting said lengthened shapes to one or more desired thicknesses, in a second direction perpendicular to said first direction to produce the three-dimensional products; and rules for selecting common or specialized material size;

d) assigning relative weights of importance to said input parameters and to said manufacturing rules and objectives;

e) computing, based on said input parameters, on said manufacturing rules and objectives and on said relative weights of importance, a production floor work plan schedule for production of three-dimensional products for selected jobs associated with the job data, whereby a production order specifies for at least one given job, one or more nests and resources to cut the one or more nests and to produce a final three-dimensional product;

f) determining whether the production floor work plan schedule is efficient in utilization of materials and of said production floor resources available; if said schedule is determined to be efficient, outputting said production floor work plan schedule;

g) if said computed production floor work plan schedule is determined to be inefficient, repeating steps (d) and (e) until said production floor work plan schedule is determined to be efficient.

2. The method of claim 1, wherein said input parameters are additionally selected from: labor costs; storage costs; cost for post-slicing to single parts; costs for post cutting product gluing and assembly; and workforce availability.

3. The method of claim 1, wherein said manufacturing rules and objectives are additionally selected from: rules for mixing a plurality of jobs in a single run; and rules to avoid overload of machinery.

4. The method of claim 1, wherein said material utilization rules comprise: determine when a relatively large quantity of final product is required; design a nest for said product so as to utilize horizontal cutting machines on a large block of material such to produce lengthened tubes of material shaped to include a plurality of three dimensional shaped parts required, placed end-to-end upon said tube; and cut said tubes vertically into individual parts.

5. The method of claim 1, wherein said job data comprises one or more of: quantity of an order; selection of a specific type of material; geometry of individual parts; quantity of each piece; and customer contact information.

6. The method of claim 1, wherein said machine run rules are selected from:
optimal time slot for running a predefined machine;
maximal and minimal number of hours for running a predefined machine;
only run a predefined machine if a specific amount of job orders have been received; and
selection of a small sized machine for a small job.

7. The method of claim 1, wherein said production floor resources comprises one or more of: availability of personnel; and selection of a production facility.

8. The method of claim 1, wherein the large block of three-dimensional material is a bun.

9. A computerized system for producing an efficient production floor work plan schedule for producing three-dimensional products by cutting a three-dimensional block of material via three-dimensional nesting, said system comprising:

an input interface configured to receive input parameters comprising job data, due dates, product design data, production floor resources available; inventory data and manufacturing rules and objectives;

a processing unit operatively connected to the input interface;

a storage unit operatively connected to the processing unit to store the input parameters; the storage unit also containing instructions that when executed by the processing unit cause the processing unit to:

a) receive input parameters comprising job data, due dates, product design data, production floor resources available and inventory data;

b) maintain in memory manufacturing rules and objectives, comprising material utilization rules and further comprising one or more of: nesting restrictions, manufacturing limitations, and machine run rules;

c) wherein said material utilization rules for utilization of said three-dimensional block of material, comprises:
rules to avoid creation of unnecessary surplus parts;
rules to avoid creation of odd-shaped remnants;
rules for selection between use of pre-sliced material or use of large blocks of material to be cut by horizontal cutting machines; and
rules for selecting an optimal nesting pane upon a large block of material, wherein the optimal nesting pane involves rules for selecting between pre-slicing and post-slicing of said large block of material,
wherein said pre-slicing comprises cutting the large block of material in a horizontal plane into a plurality of sheets, generating nests upon said sheets, followed by vertical cutting to produce the three-dimensional products, and
wherein said post-slicing comprises cutting the large block of material in a first direction to create lengthened shapes, followed by cutting said lengthened shapes to one or more desired thicknesses, in a second direction perpendicular to said first direction to produce the three-dimensional products; and
rules for selecting common or specialized material size;

d) assign relative weights of importance to said input parameters and to said manufacturing rules and objectives;

e) compute, based on said input parameters, on said manufacturing rules and objectives and on said relative weights of importance, a production floor work plan schedule for production of three-dimensional products for selected jobs associated with the job data, whereby a production order specifies for at least one given job, one or more nests and resources to cut the one or more nests and to produce a final three-dimensional product;

f) determine whether the production floor work plan schedule is efficient in utilization of materials and of said production floor resources available; if said schedule is determined to be efficient, outputting said production floor work plan schedule;

if said computed production floor work plan schedule is determined to be inefficient, repeat steps (d) and (e) until said production floor work plan schedule is determined to be efficient.

10. The system of claim 9, wherein said steps (d) and (e) of computing a production floor work plan schedule based upon said manufacturing rules and objectives and of determining the efficiency, are performed by a nesting module, wherein said nesting module computes a plurality of nests and compares the benefits of running each nest as opposed to the cost in labor, materials and run-time.

11. The system of claim 10, wherein said nesting module performs one or more of the following:
checking the availability of resources;
checking whether nesting rules are performed;
checking cube to sheet slicing is performed efficiently;

checking the efficiency of said production floor work plan schedule.

12. The system of claim 9, wherein in step (d) said one or more nests and resources to cut the one or more nests includes at least one unit of material from which to cut a nest and/or at least one production station to use to cut the nest.

13. The system of claim 9, further comprising: an input module configured to transmit to the input interface a user's input as the manufacturing data; and an output module configured to receive signals from the output interface to indicate the production floor work plan schedule.

14. The system of claim 9 further comprising: an input/output subassembly that includes a network; wherein the input/output sub-assembly is configured to transmit to the input interface a user's input as the product input parameters, the transmission being through the network; and wherein the input/output sub-assembly is also configured to receive signals from the output interface through the network to indicate to the user the production floor work plan schedule.

15. The system of claim 9 further comprising: machinery operative to cut a nest in accordance with the signals that are indicative of computed production plan.

16. A non-transitory machine readable storage medium containing instructions associated with producing an efficient production floor plan for manufacturing three-dimensional products by cutting a three-dimensional block of material via three-dimensional nesting; the instructions when executed causing the following:
   a. receiving input parameters comprising job data, due dates, product design data, production floor resources available and inventory data;
   b. maintaining in memory manufacturing rules and objectives, comprising material utilization rules and further comprising one or more of: nesting restrictions, manufacturing limitations, and machine run rules;
   c. wherein said material utilization rules for utilization of said three-dimensional block of material, comprises:
   rules to avoid creation of unnecessary surplus parts;
   rules to avoid creation of odd-shaped remnants; rules for selection between use of pre-sliced material or use of large blocks of material to be cut by horizontal cutting machines; and
   rules for selecting an optimal nesting pane upon a large block of material, wherein the optimal nesting pane involves rules for selecting between pre-slicing and post-slicing of said large block of material,
   wherein said pre-slicing comprises cutting the large block of material in a horizontal plane into a plurality of sheets, generating nests upon said sheets, followed by vertical cutting to produce the three-dimensional products, and
   wherein said post-slicing comprises cutting the large block of material in a first direction to create lengthened shapes, followed by cutting said lengthened shapes to one or more desired thicknesses, in a second direction perpendicular to said first direction to produce the three-dimensional products; and
   rules for selecting common or specialized material size;
   d. assigning relative weights of importance to said input parameters and to said manufacturing rules and objectives;
   e. computing, based on said input parameters, on said manufacturing rules and objectives and on said relative weights of importance, a production floor work plan schedule for production of three-dimensional products for selected jobs associated with the job data, whereby a production order specifies for at least one given job, one or more nests and resources to cut the one or more nests and to produce a final three-dimensional product;
   f. determining whether the production floor work plan schedule is efficient in utilization of materials and of said production floor resources available;
   if said schedule is determined to be efficient, outputting said production floor work plan schedule;
   if said computed production floor work plan schedule is determined to be inefficient, repeating steps (d) and (e) until said production floor work plan schedule is determined to be efficient.

* * * * *